(12) United States Patent
Riskedal

(10) Patent No.: US 6,874,599 B1
(45) Date of Patent: Apr. 5, 2005

(54) FIFTH WHEEL LUBRICATION SYSTEM

(76) Inventor: Brad A. Riskedal, 133 E. Hall St., Leland, IL (US) 60531

( * ) Notice: Subject to any disclaimer, the term of this patent is extended or adjusted under 35 U.S.C. 154(b) by 153 days.

(21) Appl. No.: 10/317,403

(22) Filed: Dec. 11, 2002

(51) Int. Cl.$^7$ .............................................. F01M 11/04
(52) U.S. Cl. ........................ 184/105.3; 184/28; 184/39; 184/7.2
(58) Field of Search ................................ 184/6.4, 6.19, 184/28, 29, 39, 55.1, 100, 105.3, 108, 7.2, 184/7.3, 7.4; 280/433

(56) References Cited

U.S. PATENT DOCUMENTS

| | | | | |
|---|---|---|---|---|
| 1,732,579 A | * | 10/1929 | Gleason ....................... | 184/7.3 |
| 2,908,898 A | * | 10/1959 | Mueller et al. ............. | 340/529 |
| 2,914,630 A | * | 11/1959 | Ralston ..................... | 200/83 B |
| 3,743,054 A | * | 7/1973 | Jones, Jr. ..................... | 184/14 |
| 3,887,251 A | * | 6/1975 | McKay ....................... | 384/421 |
| 4,541,651 A | * | 9/1985 | Koster ........................ | 280/433 |
| 4,586,726 A | * | 5/1986 | Capps ........................ | 280/432 |
| 5,417,308 A | * | 5/1995 | Hartl .......................... | 184/6.4 |
| 5,845,802 A | * | 12/1998 | Bruns et al. ................. | 220/293 |
| 6,098,754 A | * | 8/2000 | Toner .......................... | 184/14 |

* cited by examiner

Primary Examiner—David M. Fenstermacher

(57) ABSTRACT

A fifth wheel lubricating system for greasing the interface between the upper and lower fifth wheel plates while the trailer is couple to the tractor. The system supplies grease form a cartridge that is coupled to a solenoid activated grease valve and controlled by means of an electrical controller mounted in the cab or on the catwalk of the fifth wheel tractor. The grease gun is operated pneumatically from an onboard air compressor or can be manually operated by means of a hand pump lever built into the grease gun. A primary grease hose carries grease from the grease valve to a grease distribution hub, where it is distributed to two or more distribution hoses that connect to the bottom side of the tractor mounted lower fifth wheel plate. The grease is forced up through holes in the lower fifth wheel plate, into grease slots on the top side of the lower plate. In operation, the driver can push a button on the controller and force a desired amount of grease into the grease slots located at the interface between the upper and lower fifth wheel plates, thereby providing a more convenient, cleaner, and more efficient means of lubricating a fifth wheel.

14 Claims, 2 Drawing Sheets

FIFTH WHEEL LUBRICATION SYSTEM

BACKGROUND OF THE INVENTION

1. Field of the Invention

The present invention relates to a lubrication system for use in lubricating the interface of fifth wheel upper and lower plates. The lubrication system has particular utility in connection with the greasing of the fifth wheel plate interface when a trailer is coupled to the tractor.

2. Description of the Prior Art

Applying grease to the interface between the lower fifth wheel plate mounted on a tractor and the upper fifth wheel pin plate located on a trailer is extremely important to the operation, safety, and reliability of a tractor-trailer rig. This lubrication process needs to be carried out with the trailer coupled to the tractor, to avoid having to disconnect the trailer from the tractor in order to grease the fifth wheel. However, typical systems for lubricating the fifth wheel involve reservoirs of grease, which can be inconvenient and messy to use.

The use of fifth wheel lubrication apparatus is known in the prior art. For example, U.S. Pat. No. 5,417,308 to Hartl discloses trailer fifth wheel lubrication apparatus, which forces lubricant from a reservoir, through a distribution assembly and through holes into slots on the top surface of the lower fifth wheel plate. The patent also discloses a hand-activated grease gun that can be used to supply grease to an in-line T-connector located prior to the distribution assembly. However, the Hartl '308 patent does not disclose a cartridge grease gun apparatus that can be both hand operated and/or controlled by pneumatic means for fast and clean lubrication of a fifth wheel.

U.S. Pat. No. 6,098,754 to Toner discloses a Pneumatic greasing system for a fifth wheel that supplies grease from a reservoir to compartments beneath the lower fifth wheel plate and then forces the grease upward through orifices to the upper surface of the plate. However, the Toner '754 patent does not use a cartridge grease gun apparatus that can be hand operated and/or controlled by pneumatic means for fast and clean lubrication of the fifth wheel.

Similarly, U.S. Pat. No. 3,743,054 to Jones discloses trailer fifth wheel lubrication that applies the lubricant from the upper fifth wheel pin plate mounted on the trailer. However, the Jones '054 patent does not disclose the application of the lubricant to the lower fifth wheel plate.

Lastly, U.S. Pat. Nos. 4,541,651 to Koster and 3,367,446 to Higgins may be of general interest and pertinent to the construction and design of the present invention. The Koster '651 patent uses a lubricant reservoir mounted above the upper fifth wheel pin plate to dispense the lubricant. The Higgins '446 patent discloses a motor vehicle chassis lubrication system. However, neither the Koster '651 or the Higgins '446 patents use a cartridge grease gun apparatus for lubricating the fifth wheel interface that can be hand operated or controlled pneumatic means for fast and clean lubrication of the fifth wheel.

While the above-described devices fulfill their respective, particular objectives and requirements, the aforementioned patents do not describe a fifth wheel lubrication system that uses a cartridge grease gun apparatus, which can be hand operated or controlled by pneumatic means for fast and clean lubrication of the fifth wheel.

Therefore, a need exists for a new and improved fifth wheel lubrication system that can be used to lubricate the interface between the lower fifth wheel plate, mounted on a tractor, and the upper fifth wheel pin plate, located on a trailer. In this regard, the present invention substantially fulfills this need. In this respect, the fifth wheel lubrication system according to the present invention substantially departs from the conventional concepts and designs of the prior art, and in doing so provides an apparatus primarily developed for the purpose of providing fast and clean lubrication of a coupled fifth wheel.

SUMMARY OF THE INVENTION

In view of the foregoing disadvantages inherent in the known types of fifth wheel lubrication apparatus now present in the prior art, the present invention provides an improved fifth wheel lubrication system, and overcomes the above-mentioned disadvantages and drawbacks of the prior art. As such, the general purpose of the present invention, which will be described subsequently in greater detail, is to provide a new and improved lubrication system, which has all the advantages of the prior art mentioned heretofore and some novel features that result in a lubrication system that is not anticipated, rendered obvious, suggested, or even implied by the prior art, either alone or in any combination thereof.

To attain this, the present invention essentially comprises a fifth wheel lubricating system for greasing the interface between the upper and lower fifth wheel plate while the trailer is couple to the tractor. The grease is supplied from cartridges, which provides a very clean method of greasing the interface between the upper and lower fifth wheel plates. The output of the grease cartridge is coupled to a solenoid activated grease valve, which is controlled from an electrical controller mounted in the cab or on the catwalk of the fifth wheel tractor. The grease gun is operated pneumatically from an onboard air compressor or can be manually operated by means of a hand pump lever built into the grease gun. A primary grease hose connects to the output of the grease valve to carry grease from the grease valve to the vicinity of the lower fifth wheel plate, which is mounted on the rear portion of the tractor frame, where the hose connects to a grease distribution hub. This hub can be as simple as a tee for connecting two distribution hoses or can have a plurality of distribution ports connecting to corresponding distribution hoses. The distribution hoses have a screw-on elbow fitting at the outer end, which screws into through-holes from the bottom side of the lower fifth wheel plate. The grease is forced up through these through-holes into grease slots located on the top side of the lower fifth wheel plate.

In operation, the driver can push a button on the controller and force a desired amount of grease into the grease slots located at the interface between the lower and upper fifth wheel plates, while the trailer is coupled to the tractor. This provides a more convenient, clean, and efficient means of lubricating a fifth wheel, thereby preventing premature wear of the fifth wheel plates plus providing for safer driving conditions. The fact that the grease is contained in cartridges provides a much cleaner operating environment for the driver or mechanic.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current preferred embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention is to provide a new fifth wheel lubrication system that provides in the apparatuses and methods of the prior art some of the advantages thereof, while simultaneously overcoming some of the disadvantages normally associated therewith.

It is another object of the present invention to provide a new and improved fifth wheel lubrication system that may be easily and efficiently manufactured and marketed.

An even further object of the present invention is to provide a new and improved fifth wheel lubrication system that has a low cost of manufacture with regard to both materials and labor, and which accordingly is then susceptible of low prices of sale to the trucking and consuming public, thereby making such lubrication apparatus economically available to the buying public.

Still another object of the present invention is to provide a fifth wheel lubrication system that is more convenient, cleaner, safer, and more efficient.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
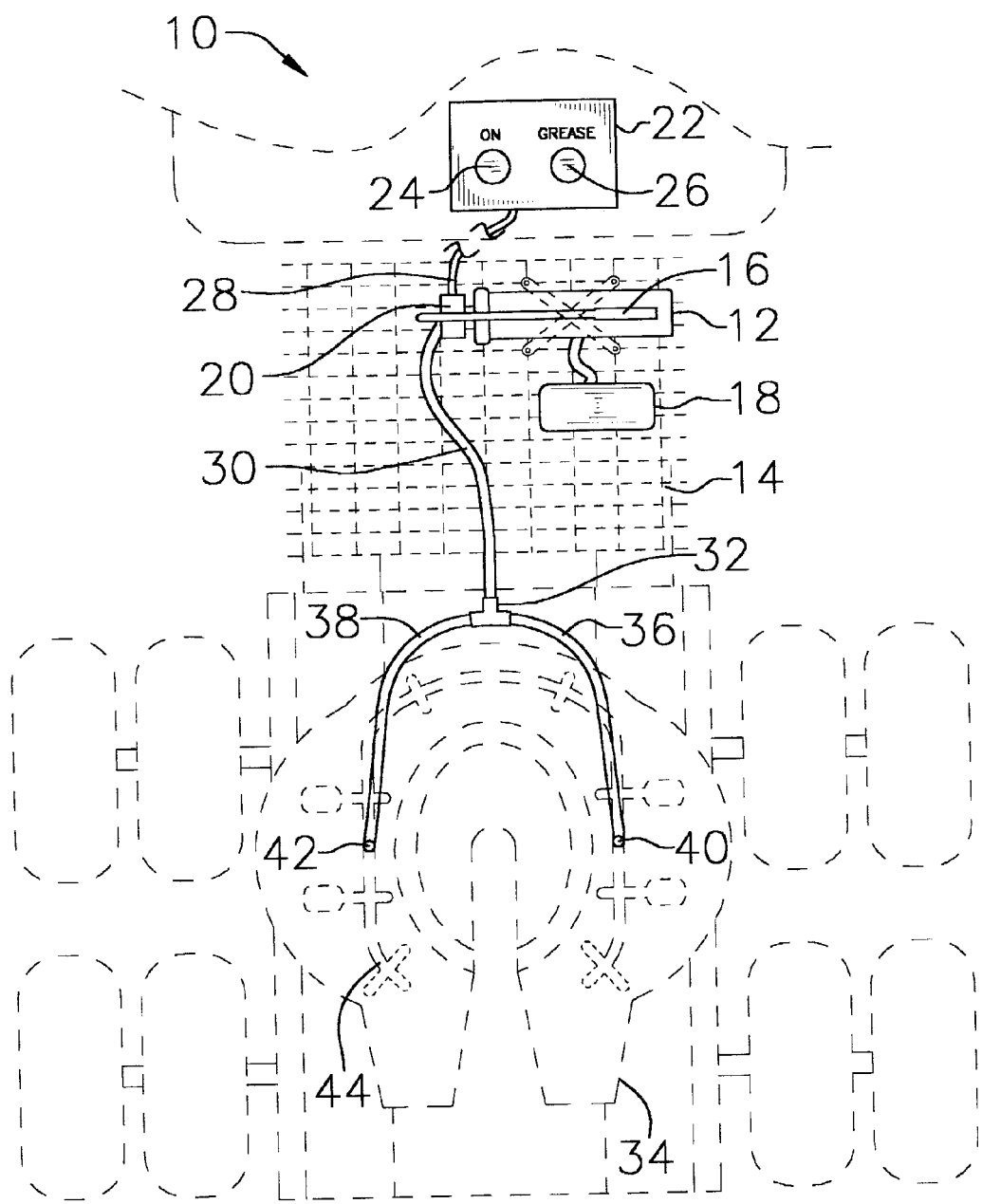
FIG. 1 is a drawing illustrating the preferred embodiment of the fifth wheel lubrication system constructed in accordance with the principles of the present invention.
Figure 2:
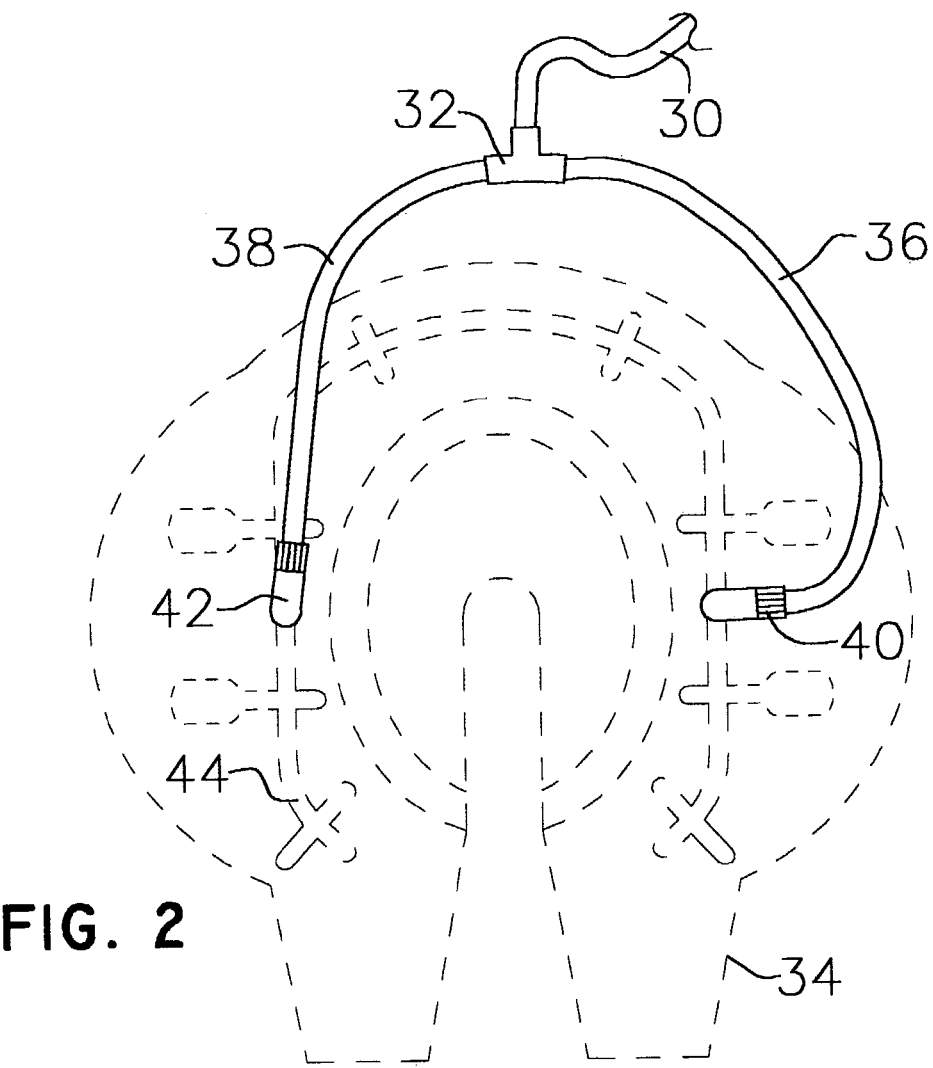
FIG. 2 is a drawing showing the distribution of the lubricant to the bottom side of the lower fifth wheel plate in the fifth wheel greasing system of the present invention.
Figure 3:
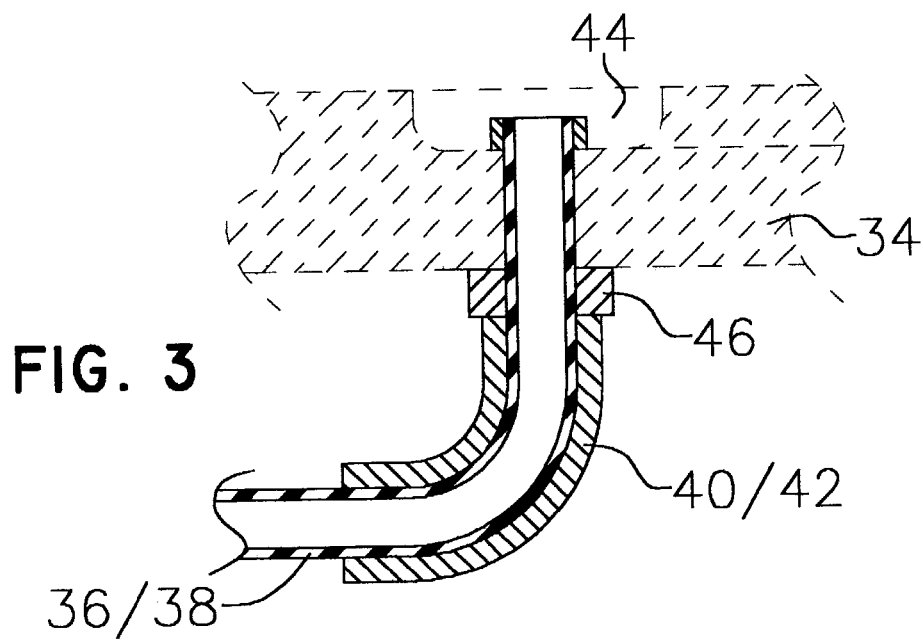
FIG. 3 is a drawing showing how the lubricant is supplied to slots on the top side of the lower fifth wheel plate in the fifth wheel greasing system of the present invention.

Referring now to the drawings, and particularly to FIGS. 1–3, a preferred embodiment of the fifth wheel lubrication system of the present invention is shown and generally designated by the reference numeral 10.

In FIG. 1, a new and improved fifth wheel lubrication system 10 of the present invention for greasing the interface between the upper and lower fifth wheel plates is illustrated and will be described. More particularly, the fifth wheel lubrication system 10 has a grease gun 12 mounted on the catwalk 14 or some other convenient location on the tractor. Grease is pneumatically forced from the grease gun 12 by an on-board air compressor 18, or optionally can be manually pumped from the gun 12 by means of a hand lever 16. The output of the grease gun 12 is connected to a closely mounted solenoid activated grease valve 20, which is electrically controlled by means of a controller 22 located in the tractor cab or on the catwalk 14 and connected to the solenoid/grease valve 20 by means of an electrical cable 28. The controller has various switches, including at least an ON/OFF switch 24 and a push-to-activated grease switch 26. A primary grease hose 30 is connected from the output of the grease valve 20 to a grease distribution hub 32, where the grease is distributed to a plurality of distribution hoses 36,38 that connect to threaded through-holes on the bottom side of the lower fifth wheel plate 34. The distribution hub can be as simple as a tee 32 for distributing the grease through two hoses or an assembly having multiple ports for connecting a plurality of distribution hoses.

FIGS. 2 and 3 are expanded drawings showing the layout and connection of the distribution hoses 36,38, which carries the lubricant from the distribution hub 32 to the bottom side of the lower fifth wheel plate 34. Elbow fittings 40,42 having screw-on connectors 46 are provided at the end of the respective distribution hoses 36,38, which screw into threaded through-holes in the lower fifth wheel plate 34 from the bottom side. The grease is then forced up through these through-holes into grease slot 44 located on the top side of the lower fifth wheel plate 34.

In use, the driver can push a button 26 on the controller 22 and force a desired amount of grease into the grease slots 44 located on the top side of the lower fifth wheel plate 34, at the interface between the lower and upper fifth wheel plates, while the trailer is coupled to the tractor. This system provides a more convenient, clean, and efficient means of lubricating a fifth wheel, thereby preventing premature wear of the fifth wheel plates and providing safer driving conditions. The fact that the grease is contained in cartridges provides a much cleaner operating environment for the driver.

While a preferred embodiment of the fifth wheel lubrication system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the distribution hub can be a simple tee supporting two distribution hoses or a multi-port assembly supporting a plurality of distribution hoses, according to the design of the lower fifth wheel plate.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A grease dispensing apparatus for a fifth wheel, comprising:
    an air compressor;
    a grease gun, said grease gun having pneumatic means and manual means for dispensing grease, said pneumatic means coupled to the output of said air compressor and said manual means comprising a hand-lever pump;
    a grease cartridge inserted into said grease gun;
    a solenoid valve, the input of said solenoid valve coupled to the output of said grease gun;
    an electrical controller wired to said solenoid for activating and controlling the dispensing of said grease;
    a primary lubrication hose connected between the output of said solenoid valve and a grease distribution hub; and
    a plurality of distribution hoses attached to multiple outputs of said grease distribution hub, said distribution hoses having screw-on elbow fittings at the outer end for connecting to the bottom side of a lower fifth wheel plate.

2. The apparatus of claim 1, wherein said distribution hub consists of a tee for supporting two output distribution hoses.

3. The apparatus of claim 1, wherein said apparatus is installed in fifth wheel applications from the group consisting of tractor-trailer rigs and recreational vehicles.

4. The apparatus of claim 1, wherein said electrical controller controls the functions consisting of
    power ON/OFF and
    dispensing of grease.

5. A lubrication system for a fifth wheel, comprising:
    an air compressor,
    a grease gun, said grease gun having pneumatic means and manual means for dispensing grease, said pneumatic means coupled to the output of said air compressor and said manual means comprising a hand-lever pump;
    a grease cartridge inserted into said grease gun;
    a solenoid valve, the input of said solenoid valve coupled to the output of said grease gun;
    an electrical controller wired to said solenoid for activating and controlling the dispensing of said grease;
    a primary lubrication hose connected between the output of said solenoid valve and a grease distribution hub;
    a lower fifth wheel plate, said plate having through-holes from the bottom side to intersect with grease slots on the top side, said through-holes being threaded on the bottom side; and
    a plurality of distribution hoses coupled from the grease outputs of said grease distribution hub to said treaded through-holes on bottom side of said fifth wheel plate by means screw-on elbow fittings, thereby allowing grease to be dispensed into said grease slots on top side of said fifth wheel plate.

6. The system of claim 5, wherein said distribution hub consists of a tee for supporting two output distribution hoses.

7. The system of claim 5, wherein said system is installed in fifth wheel vehicles from the group consisting of tractor-trailer rigs and recreational vehicles.

8. The system of claim 5, wherein said electrical controller controls the functions consisting of
    power ON/OFF; and
    dispensing of grease.

9. A fifth wheel vehicle with fifth wheel interface lubrication apparatus, comprising:
    a tractor, said tractor having an engine and cab mounted on a frame, said tractor including lower fifth wheel plate mounted to the rear of said frame, said fifth wheel plate having through-holes from the bottom side to intersect with grease slots on the top side, said through-holes being threaded on the bottom side, said tractor further having a catwalk area between said lower fifth wheel plate and said cab;
    a trailer, said trailer having a front mounted upper fifth wheel pin plate for attaching said trailer to said fifth wheel lower plate on said tractor;
    an air compressor, said compressor mounted on said catwalk;
    a grease gun, said grease gun mounted on said catwalk, said grease gun further having pneumatic means and manual means for dispensing grease, said pneumatic means coupled to the output of said air compressor and said manual means comprising a hand-lever pump;
    a grease cartridge inserted into said grease gun;
    a solenoid valve, said solenoid valve being mounted on said catwalk, and the input of said solenoid valve being coupled to the output of said grease gun;
    an electrical controller wired to said solenoid for activating and controlling the dispensing of said grease;
    a primary lubrication hose connected between the output of said solenoid valve and a grease distribution hub;
    a plurality of distribution hoses coupled from multiple outputs of said grease distribution hub to said treaded through-holes on bottom side of said fifth wheel plate by means screw-on elbow fittings, dispensing grease into said grease slots on top side of said fifth wheel plate, thereby providing lubrication to the interface area between said fifth wheel upper and lower plates.

10. The fifth wheel vehicle of claim 9, wherein said electrical controller is mounted in said vehicle cab.

11. The fifth wheel vehicle of claim 10, wherein said electrical controller controls the functions consisting of
    power ON/OFF and
    dispensing of grease.

12. The fifth wheel vehicle of claim 9, wherein said electrical controller is mounted in said catwalk area.

13. The fifth wheel vehicle of claim 9, wherein said distribution hub consists of a tee for supporting two output distribution hoses.

14. The fifth wheel vehicle of claim 9, wherein said vehicle is a recreational vehicle.

\* \* \* \* \*